United States Patent
Suko et al.

(10) Patent No.: US 8,057,340 B2
(45) Date of Patent: Nov. 15, 2011

(54) CHAIN

(75) Inventors: Tomoo Suko, Osaka (JP); Katsuya Enomoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 255 days.

(21) Appl. No.: 12/405,562

(22) Filed: Mar. 17, 2009

(65) Prior Publication Data

US 2009/0318254 A1    Dec. 24, 2009

(30) Foreign Application Priority Data

Jun. 18, 2008   (JP) ................. 2008-159241

(51) Int. Cl.
    *F16G 13/02*    (2006.01)
(52) U.S. Cl. ...................................... 474/206; 474/207
(58) Field of Classification Search ............... 474/206, 474/207, 231
    See application file for complete search history.

(56) References Cited

U.S. PATENT DOCUMENTS

| | | | |
|---|---|---|---|
| 4,926,529 A | 5/1990 | Hosmer | |
| 5,667,442 A | 9/1997 | Tanaka | |
| 5,745,974 A | 5/1998 | Tanaka | |
| 6,855,080 B2 * | 2/2005 | Kanehira et al. | 474/231 |
| 2002/0072443 A1 | 6/2002 | Kanehira | |
| 2007/0155563 A1 | 7/2007 | Aoki | |

FOREIGN PATENT DOCUMENTS

| | | |
|---|---|---|
| FR | 1381343 | 12/1964 |
| JP | 08-309888 | 11/1996 |
| JP | 2008-133954 | 6/2008 |

OTHER PUBLICATIONS

Search Report dated Sep. 23, 2010 of European Patent Application 09003926.4.
Office Action dated Oct. 21, 2010 of Applicant's priority Application No. 2008-159241.

* cited by examiner

*Primary Examiner* — Sang Kim
(74) *Attorney, Agent, or Firm* — Dann, Dorfman, Herrell and Skillman; Henry H. Skillman

(57) ABSTRACT

A chain has a resin member integrally molded on an inner circumferential surface of a bushing with a strong joining force between the resin member and an inner circumferential surface of the bushing. The chain has an inner link in which both end portions of a pair of front and rear bushings are press-fitted into bushing holes of a pair of right and left inner plates, and an outer link in which both end portions of a pair of front and rear pins are press-fitted into pin holes of a pair of right and left outer plates. The inner and outer links are alternately connected to each other in a longitudinal direction of the chain. The inner circumferential edge portions 112*a* of both end portions of the bushing 112 are chamfered, and the bushing is lined with the resin member 115 insert-molded on an inner circumferential surface of the bushing 112 to produce flared ends, and a central portion of the lined bushing 112 between the ends thereof becomes thicker.

9 Claims, 5 Drawing Sheets

CHAIN

FIELD OF INVENTION

The present invention relates to a roller chain or a bushing chain in which bushings are used, and more specifically relates to a chain for a filling machine for foods and lactic drinks, and the like.

BACKGROUND OF THE INVENTION

Since a chain for in a filling machine for foods and lactic drinks, and the like cannot be lubricated with oil or grease in view of hygiene, wear elongation has been increased. Since in such a chain a hygiene control is taken very seriously where cleaning is performed by use of a chemical, a corrosion resistant stainless bushing has been used. Thus there was a reason for decreasing wear resistance.

Horizontal opposite driving of chains are often performed in a filling machine. However, in such a case when a wear elongation difference between the right and left chains is generated, matching of the phases of the chains must provided. Thus, the frequency of the maintenance operations is high, and long time for maintenance is required. The maintenance operation needs a well trained operator whereby the maintenance cost is very high.

A chain in which a resin member is integrally molded on an inner circumferential surface of a bushing so that wear resistance is improved, has been known (see for example Japanese Laid-open Patent Publication No. Hei. 8-309888).

PROBLEMS TO BE SOLVED BY THE INVENTION

A problem has been pointed out that such a wear resistant chain in which a resin member is integrally molded on an inner circumferential surface of a conventional bushing, has weak joining force between a resin member and an inner circumferential surface of a bushing so that the resin member is displaced in an axial direction and rotates within the bushing, whereby endurance of the chain is reduced.

Accordingly, to solve a technical problem, an object of the present invention is to provide a chain in which a resin member is securely molded on an inner circumferential surface of a conventional bushing, characterized in that joining force between the resin member and an inner circumferential surface of the bushing is strengthened so that endurance is improved.

SUMMARY OF THE INVENTION

The invention solves the above-described problem by providing a chain with inner and outer links alternately connected to each other in a longitudinal direction of the chain, in which the inner links have a pair of inner plates with bushing holes into which both end portions of a pair of front and rear bushings are press-fitted, and the outer links have pin holes into which the opposite end portions of a pair of front and rear pins are press-fitted. In the chain of the present invention, the circumferential edge portions of opposite end portions of the bushing are chamfered, and a resin liner member is insert-molded on an inner circumferential surface of the bushing such that a central portion of the lined bushing in the axial direction thereof is thicker than the axial ends of the lined bushing.

In one embodiment of the invention, the bushing is a wound bushing and the resin member is immersion-solidified into a slit of a molding joint of the wound bushing.

The invention may also provide at least one axial groove on the inner circumferential surface of the bushing and the resin member has a protrusion immersion-solidified into groove.

In the chain, the resin member is preferably made of a resin which has self-lubrication properties, high chemical-heat- and wear-resistance, and is highly capable of melt fabrication, for example polyetheretherketone resin.

In the chain according to the invention, a central portion of the lined bushing in the axial direction thereof is thicker than the axial ends of the bushing, and the outer circumferential surface of the liner is brought into intimate contact with an inner circumferential edge portion of a chamfered bushing at both end portions of the liner and becomes flared toward the outside. Thus, since the resin liner member is molded in a bushing-embraced form, it is reliably prevented from being displaced in the axial direction.

When a bushing is press-fitted into bushing holes of inner plates at the time of assembly of the chain so that diameters of the both end portions of the bushing are reduced whereby the bushing is deformed into a barrel shape and the resin member's central portion becomes a bowed-in wall which becomes flat when a pin and a surface of the resin member are brought into surface contact with each other. Thus, one side contact of the inner circumferential portion of the bushing with an outer circumferential surface of the pin is prevented so that an initial wear elongation of the chain can be reduced and at the same time the wear resistance can be significantly improved.

When the chain's bushings are wound bushings and the resin member is immersion-solidified to produce a protrusion projecting into the slit of the molding joint of the wound bushing, a rotation of the resin member in the bushing can be reliably prevented. Thus, the endurance of the chain can be improved.

When the chain includes at least one axial groove provided on the inner circumferential surface of the bushing and the resin member protrudes and is immersion-solidified into the groove, a rotation of the resin member in the bushing can be reliably prevented. Thus, the endurance of the chain can be improved.

The chain's resin member is preferably a polyetheretherketone resin, and the polyetheretherketone resin is excellent in chemical resistance. Initial wear elongation of the chain can be reduced even in use where cleaning is performed by using a chemical and at the same time the wear resistance can be significantly improved. Since the polyetheretherketone resin has excellent self-lubricating properties, a non-lubrication operation of the chain can be realized.

When the joining force between a resin member and an inner circumferential surface of a bushing is strengthened, endurance is improved, chamfering the inner circumferential edge portions of both end portions of the bushing. The resin liner member is insert-molded on the inner circumferential surface of the bushing such that a central portion of the lined bushing in the axial direction thereof becomes thicker than the axial ends.

For example, initial wear elongation of the chain can be reduced by preventing one side contact of an outer circumferential surface of a pin with an inner circumferential edge of both ends of a bushing so that a contact state between the inner circumferential surface of the bushing and the outer circumferential surface of the pin is uniformly maintained. This feature may be used in any chain such as a roller chain and a bushing chain may.

Resins used in the chains of the present invention may be engineering plastics having required heat resistance, wear resistance, chemical resistance and the like in accordance with use of the chains can be used.

DESCRIPTION OF THE PREFERRED EMBODIMENTS

A first embodiment of a chain of the present invention will be described with reference to FIGS. 1 to 5.

Figure 1:
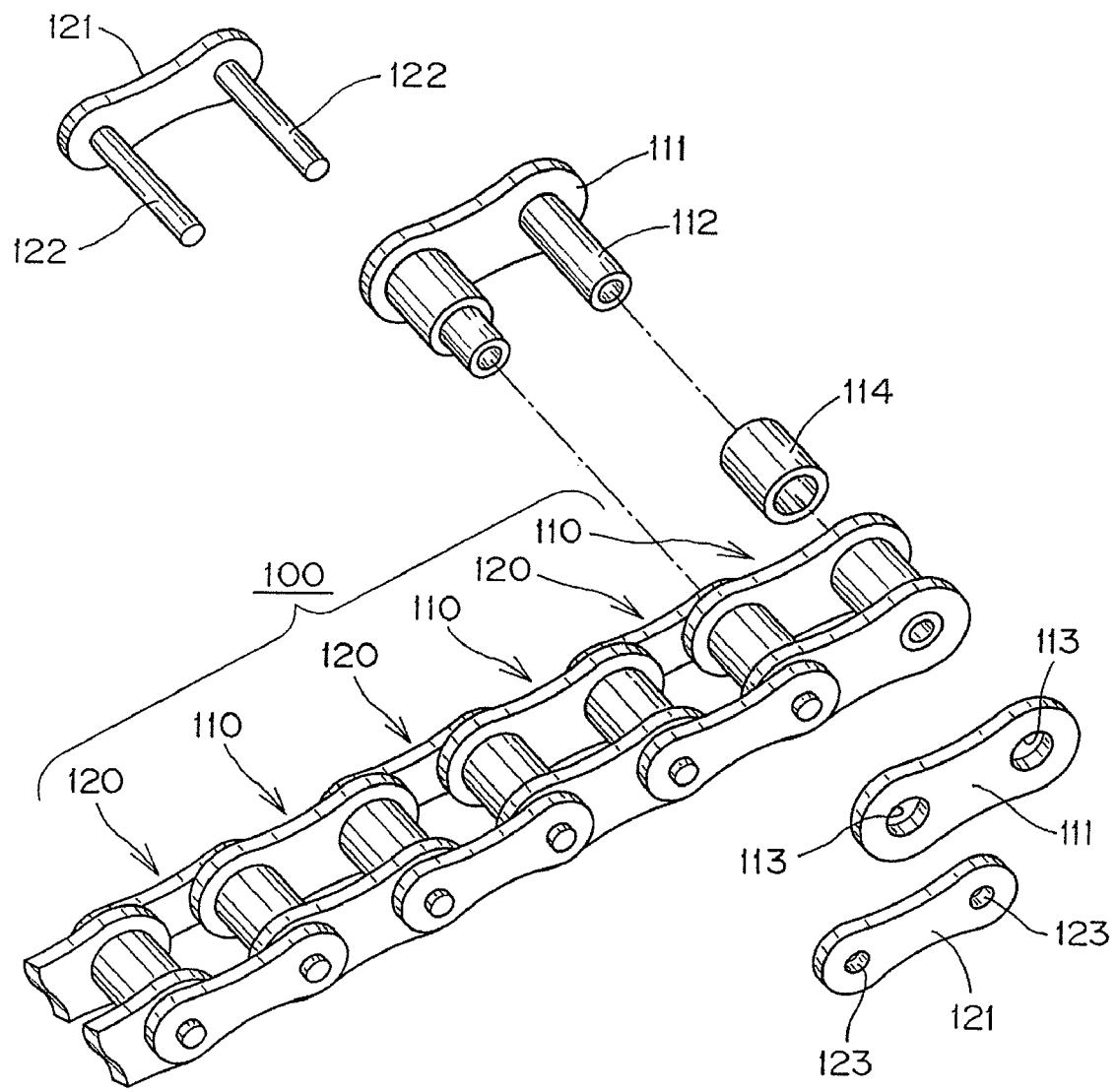
FIG. 1 is a perspective view showing a part of a chain, which is example 1 of the present invention, with exploded views of the individual components of the outer and inner links.

A chain 100 is composed of inner links 110 and outer links 120 such that the inner link 110 and the outer link 120 are alternately connected to each other in a large number as shown in FIG. 1. The inner link 110 is composed of a pair of inner plates 111 each having two bushing holes 113. Two hollow cylindrical bushings 112 have both end portions press-fitted into bushing holes 113 of the pair of inner plates 111 and rotatably mount rollers 114. The outer link 120 is composed of a pair of outer plates 121 each having two pin holes 123, and two pins 122, both end portions of which are press-fitted into the pin holes 123 of the pair of outer plates 121. The inner link 110 and the outer link 120 are alternately connected to each other in a large number by fit-inserting the pins 122 into the cylindrical bushings 112 to form a length of the chain 100.

Figure 2:
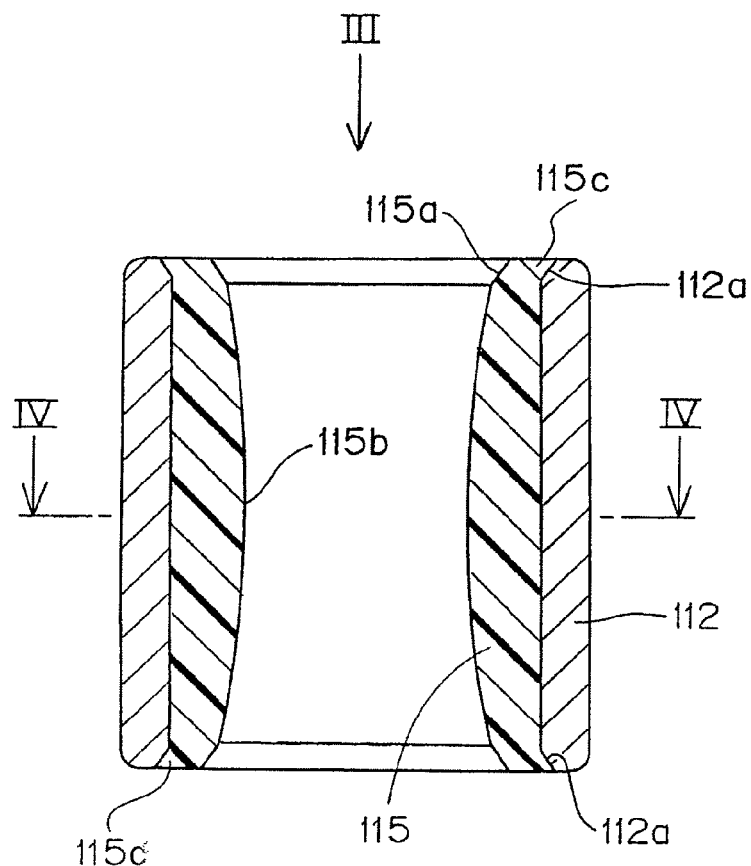
FIG. 2 is a cross-sectional view taken along a plane passing through the bowed-in central axis of a bushing of the chain of FIG. 1 with the bow exaggerated.
Figure 3:
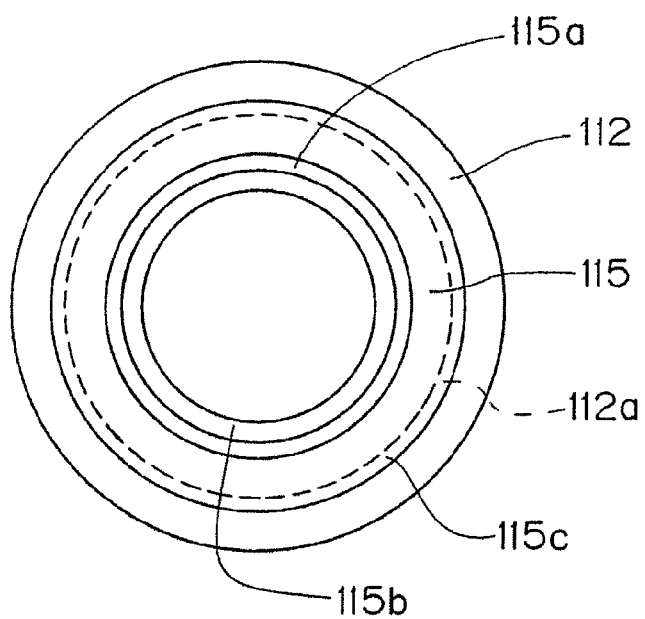
FIG. 3 is a plan view obtained when FIG. 2 was viewed from a direction of an arrow III.
Figure 4:
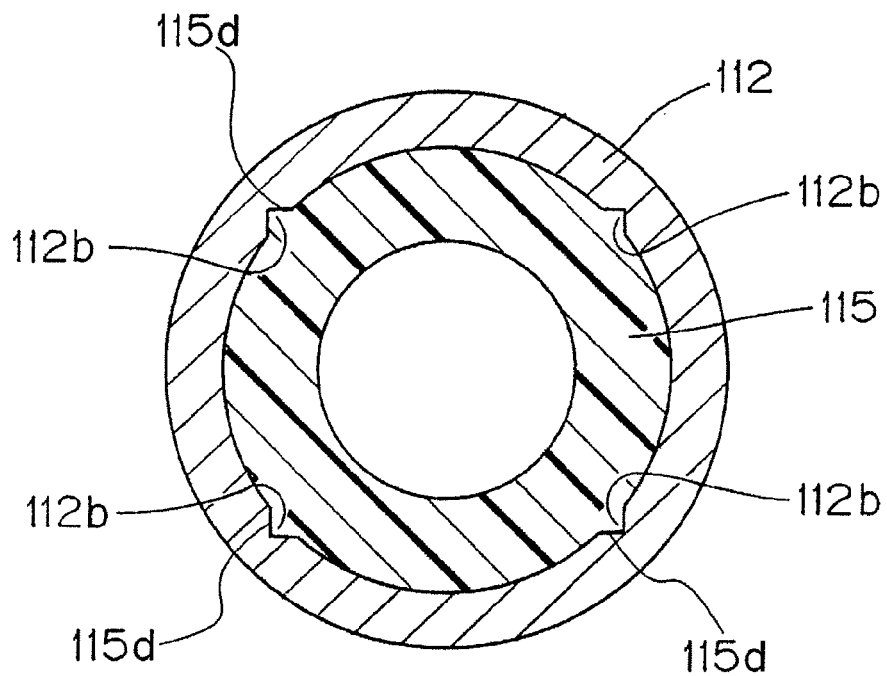
FIG. 4 is a cross-sectional view taken along the line IV-IV line of FIG. 2.

Stainless steel is used in the bushing 112. As shown in FIG. 2, the inner circumferential edge portions 112a of both end portions of the bushing 112 are chamfered. As shown in FIG. 4, at least one axial groove 112b is provided on an inner circumferential surface of the bushing 112. In the illustrated embodiment, four axial grooves 112b are provided on the inner circumferential surface of the bushing 112 at the equal intervals. The cross-sectional shape of the groove 112b is not critical. However, a V-shaped section is preferable since a resin liner member 115 can have protrusions 115d penetrating the entire area of the groove 112b. The resin member 115 is insert-molded on an inner circumferential surface of the bushing 112 so that the axial central portion of the lined bushing 112 is bowed out inwardly to provide a thickness, as indicated at 115b. In the embodiment of FIGS. 1-5, the resin liner member 115 is a polyetheretherketone excellent in chemical resistance and self-lubricating properties.

To insert-mold the resin liner member 115 on the inner circumferential surface of the bushing 112 so that the axial central portion of the lined bushing 112 bows inwardly and has thickness, the following method, as an example, can be used. First, a bushing 112 having inner circumferential edge portions 112a at both ends previously-chamfered is mounted on a mold. Then, an axial central portion-slightly-diameter-reduced tsuzumi (hand drum)-shaped core is inserted into the inside of the bushing 112. Then, a resin is injected to the clearance between the inner circumferential surface of the bushing 112 and the outer circumferential surface of the tsuzumi-shaped core. The injected resin enters a chamfered portion at both end portions of the bushing 112, as shown in FIGS. 2 and 3, so that the resin liner has flared ends 115c which embrace the opposite ends of the bushing 112. After that, the tsuzumi-shaped core is removed before the resin member is cooled whereby the resin liner member is molded on the inner circumferential surface of the bushing 112 so that the axial central portion 115b of the lined bushing 112 is bowed inwardly to provide the thick wall surface 115. The bow of the bowed-in surface 115b is exaggerated in the drawings.

As shown in FIG. 2, the flared inner circumferential edge portions 115a of both end portions of the resin member 115 are internally chamfered. This chamfering makes the insertion of the pin into the bushing 112 easy whereby cracks at end portions of the resin member 115 can be prevented.

In FIG. 3, a hidden region, denoted by a reference numeral 112a and surrounded by a solid line circle and a broken line circle, shows an inner circumferential edge portion of the chamfered bushing 112. That is the broken line circle shows an inner circumferential surface of the bushing 112. Thus, the resin member 115 is prevented from being displaced or shifted in the axial direction by covering chamfered portions of the bushing 112 by the flared ends 115c of the resin member 115. Further, a region denoted by the reference numeral 115a and surrounded by two solid line circles, shows an inner circumferential portion of the chamfered member 115. The innermost solid line circle shows the thickest wall portion of the resin member 115 and it also shows the inner circumferential surface of an axial central portion. It is noted that FIGS. 2 and 3 exaggeratedly show the wall thickness of the axial central portion, and an actual wall thickness (a difference between the thicknesses of the thickest portion and the thinnest portion) is about 10 to 100 μm. This wall thickness is determined to be the same as the amount of deformation that is a difference between a radius at the axial central portion of the bushing and a radius of both end portions by measuring a deformation of the bushing, which is generated during an assembly of the chain, which is described later.

Figure 5:
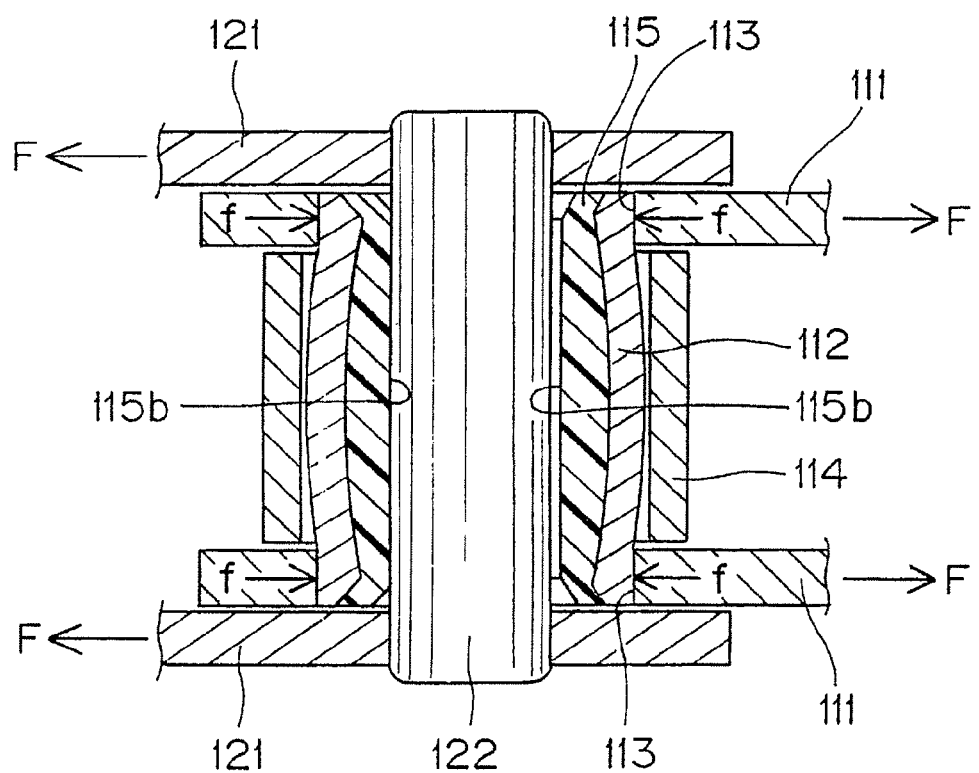
FIG. 5 is a cross-sectional view along a pitch line of the chain in a condition when tension is applied to the chain with the bows of bowed-out surfaces exaggerated.

The advantages obtained when the above-described bushing 112 is assembled to a chain will be described in connection with FIG. 5. The bushing 112 is press-fitted into bushing holes 113 provided in inner plates 111. At this time since an outer circumference of the bushing 112 and the bushing hole 113 are fitted to each other with interference, both end portions of the lined bushing 112 are diameter-reduced by receiving force f from the inner plate 111 so that the entire lined bushing 112 is deformed into a barrel shape. As a result, the inner circumferential surface 115b of a resin member 115 insert-molded on the inner circumferential surface of the bushing 112 so that the thicker axial central portion 115b becomes flat in the axial direction. Thus, the pin 122 and the inner circumferential surface 115b of the resin member 115 come into surface contact with each other when tension F is applied to the chain so that one side contact between the pin 122 and the inner circumferential surface of the bushing 112 is suppressed. Therefore, an initial wear elongation of the chain is reduced and the wear resistance can be significantly improved.

Further, since polyetheretherketone (excellent in self-lubrication properties) was used as a material of the resin member 115, a non-lubrication operation of the chain can be realized.

As described above, the chain 100 of the embodiment of FIGS. 1-5 of the present invention is chamfered in inner circumferential edge portions 112a of both end portions of the bushing 112. The resin liner member 115 is insert-molded on the inner circumferential surface of the bushing 112 so that the axial central portion of the lined bushing becomes thicker. Ends 115c of the resin member 115 insert-molded on the inner circumferential surface of the bushing 112 come into intimate contact with the inner circumferential edge portions 112a of the chamfered bushing 112 at both end portions of the bushing 112 and are flared toward the outside. Thus, since the opposite flared ends of the resin member 115 embrace the opposite ends of the bushing and capture it, the resin liner member 115 can be reliably prevented from shifting or being displaced relative to the bushing 112 in the axial direction.

Further, since at least one axial groove 112b is provided on the inner circumferential surface of the bushing 112 and the resin member 115 is immersion-solidified on the groove 112b to provide the protrusions 115d, the rotation of the resin member 115 in the bushing 112 can be reliably prevented. Therefore the endurance of the chain can be improved.

In the chain 100 of this embodiment of the present invention, the bushing 112 is press-fitted into bushing holes 113 of inner plates 111 and when both end portions of the bushing 112 are diameter-reduced, the bushing 112 is bowed-out into a barrel shape. The inner surface of the resin member 115 becomes flat when the pin 122 and the surface of the resin member 115 come into surface contact with each other. One-side contact of inner circumferential edges of both end portions of the bushing 112 with the outer circumferential surface of the pin 122 is prevented so that, an initial wear elongation of the chain is reduced and the wear resistance can be significantly improved. The advantages are very large.

Next, a chain, which is another embodiment of the present invention, will be described with reference to FIGS. 6 to 8.

Figure 6:
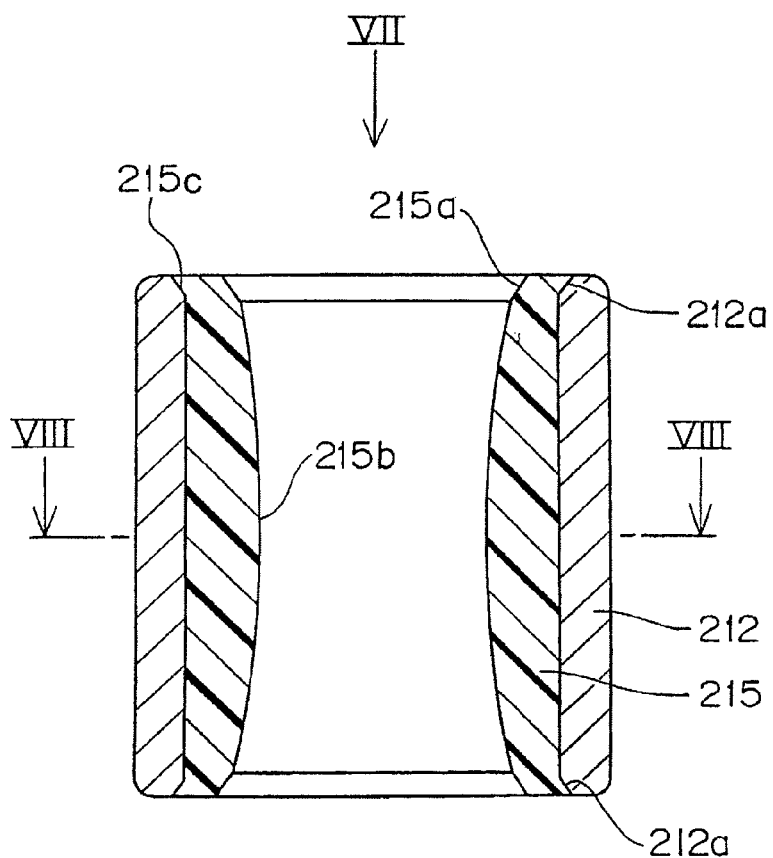
FIG. 6 is a cross-sectional view of another embodiment of a bushing of the chain prior to its assembly taken through the central axis of the bushing.
Figure 7:
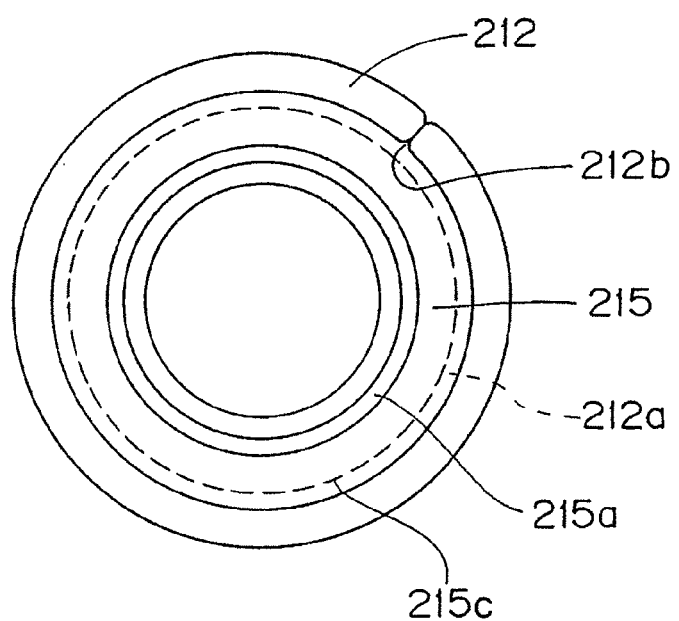
FIG. 7 is a plan view viewed from a direction of an arrow V11 in FIG. 6.
Figure 8:
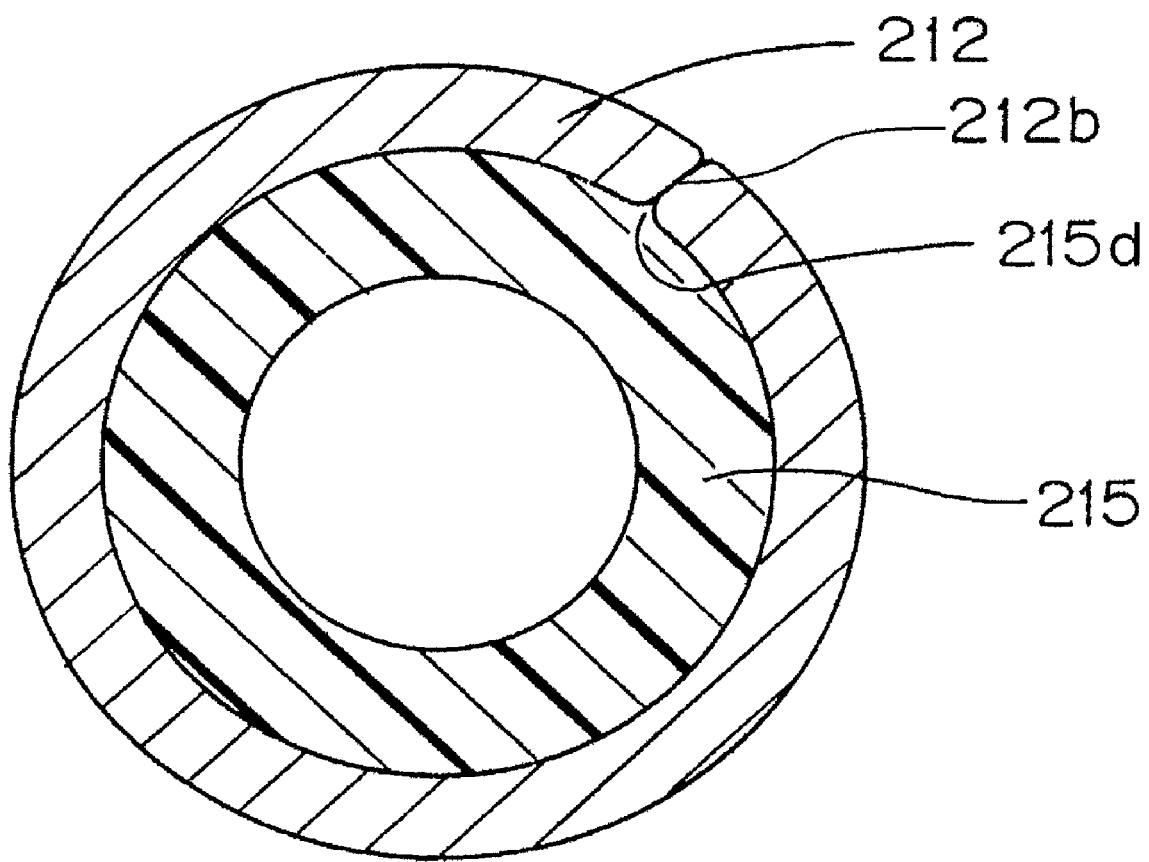
FIG. 8 is a cross-sectional view taken along the line VIII-VIII of FIG. 6.

Since the chain of this embodiment of the present invention has quite the same basic device configurations as the chain shown in FIGS. 1-5, except for the form of the bushing, the detailed description of the chain illustrated in FIGS. 6-8 is omitted. In the drawings, the parts of this embodiment which are identical to the parts 100 through 123 of the first-described embodiment, are identified by changing the reference numerals of the same components to reference numerals 200 through 223.

In the chain of this embodiment, a bushing 212 is composed of a wound bushing molded from a sheet, the ends of which are joined to form a hollow cylindrical bushing having a slit 212b at the joint. As shown in FIG. 8, a resin member 215, insert-molded on an inner circumferential surface of the bushing 212 is immersion-solidified into the slit 212b of the wound bushing to produce an axially-extending outward protrusion 215d (see FIG. 8). Therefore, the rotation of the resin 215 in the bushing 212 is prevented so that the endurance of the chain can be improved.

In FIG. 7, a hidden region of the bushing, denoted by a reference numeral 212a and surrounded by a solid line circle and a broken line circle, shows an inner circumferential edge portion of a chamfered bushing 212. That is the broken line circle shows an inner circumferential surface of the bushing 212. Thus the resin member 215 is prevented from being shifted in the axial direction by covering chamfered portions of the bushing 212 by the flared ends 215c of the resin member 215. Further, a region denoted by the reference numeral 215a and surrounded by two solid line circles, shows an inner circumferential portion of the chamfered member 215. The innermost solid line circle illustrates the thickest wall portion of the resin member 215 as determined by the inner circumferential surface 215b at an axial central portion.

As described above, the simple configurations that the chain of this embodiment of the present invention uses, i.e., the wound bushing as the bushing 212 and the resin member 215 which is immersion-solidified into a slit 212b of the molding joint of the wound bushing, prevent the rotation of the resin member 215 and the bushing 212 and the resin member 215 can be interlocked. Thus, the endurance of the chain can be improved and the advantages are very large.

The invention claimed is:

1. A chain having inner links with right and left inner plates, each having a pair of bushing holes, a pair of front and rear bushings having central portions spanning between and having two bushing end portions press-fitted into said bushing holes of said right and left inner plates, said chain having outer links with right and left outer plates, each having a pair of pin holes, a pair of front and rear pins press-fitted into said pin holes of said pair of right and left outer plates, pair of pins passing through said bushings, said bushing holes and having two pin end portions press-fitted into said pin holes to cause said inner and outer links to be alternately connected to each other in a longitudinal direction of the chain, wherein the inner circumferential surface of said bushing has at least one groove in the axial direction thereof, and inner circumferential edge portions of both of said bushing end portions are chamfered, said chain including a resin liner member composed of a self-lubricating resin capable of melt-fabrication insert-molded on an inner circumferential surface of said bushing such that the outer surface of the resin member has a central portion which confronts the central portion of said bushing in the axial direction thereof, and said resin member has a solidified protrusion in said groove, and wherein further said resin liner member has flared end portions complementary to said chamfered edge portions of said inner circumferential bushing end portions, and capturing said bushing between said flared end portions to prevent axial displacement of said resin liner member within said bushing.

2. The chain according to claim 1, wherein said bushing is a wound bushing having a hollow circumferential shell interrupted by a slit formed as a molding joint of said wound bushing, said slit comprising said at least one groove in the axial direction.

3. The chain according to claim 1, wherein said resin is a resin having high heat-, and wear-resistance.

4. The chain according to claim 3, wherein said resin is a polyetheretherketone resin.

5. The chain according to claim 1, wherein said end portions of the resin liner member are flared both internally and externally.

6. The chain according to claim 1, wherein said bushing has an outer circumferential surface which is bowed-out between said bushing holes.

7. The chain according to claim 1, wherein prior to assembly of said chain said resin member has an inner circumferential surface which is bowed-in in said central portion.

8. A chain assembled with inner links with right and left inner plates, each having a pair of bushing holes, a pair of front and rear bushings having central portions spanning between said link plates, and having two bushing end portions press-fitted into said bushing holes of said right and left inner plates, said chain having outer links with right and left outer plates, each having a pair of pin holes, a pair of front and rear pins press-fitted into said pin holes of said pair of right and left outer plates to assemble the chain, said pair of pins passing through said bushings and said bushing holes and having two pin end portions press-fitted into said pin holes to cause said inner and outer links to be alternately assembled to each other in a longitudinal direction of the chain, and rollers rotatably mounted on said bushings, wherein the inner circumferential surface of said bushing has at least one groove in the axial direction thereof, and inner circumferential edge portions of both end portions of the bushing are chamfered, said chain including a resin liner member composed of a self-lubricating resin capable of melt-fabrication insert-molded on an inner circumferential surface of said bushing such that the outer surface of the resin liner member lines the central portion of said bushing in the axial direction thereof, and said resin liner member has a central portion coextensive with said central portion of said bushing, and a solidified protrusion in said groove, said resin liner member having flared end portions complementary to said chamfered edge portions of said inner circumferential bushing end portions, and capturing said bushing between said flared end portions to prevent axial displacement of said resin liner member within said bushing by said pins when said pins come into surface contact with said bowed-in inner circumferential surface of said resin liner member during assembly of the chain, and wherein further said lined bushing has an outer circumferential surface which is bowed-out between said bushing holes, the central part of the resin member being thicker than the opposite axial ends, and said resin liner member has an inner circumferential surface which is bowed-in in said central portion prior to assembly, and composed of a material which is adapted to allow said inner circumferential surface to be flattened by said pins during assembly of the chain and to create said bowed-out outer circumferential surface of said lined bushing.

9. The chain according to claim 8, wherein said resin liner member has circumferential edge portions flared both internally and externally to mate with said chamfered end portions of said bushing.

\* \* \* \* \*